J. E. NOEGGERATH.
DYNAMO ELECTRIC MACHINE.
APPLICATION FILED APR. 13, 1909.
957,242.
Patented May 10, 1910.
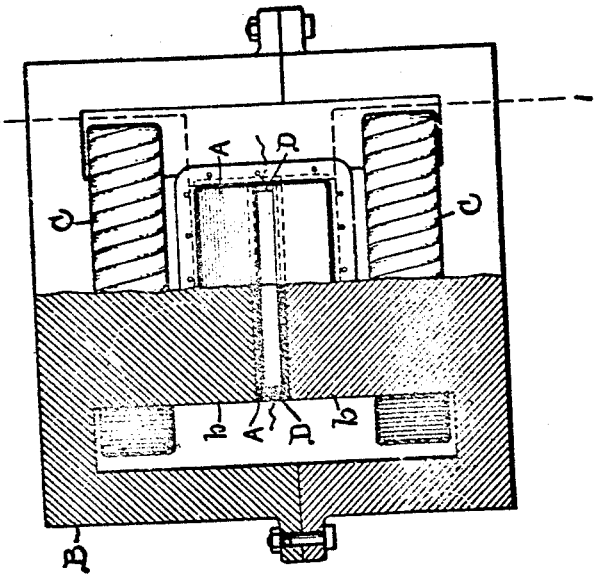
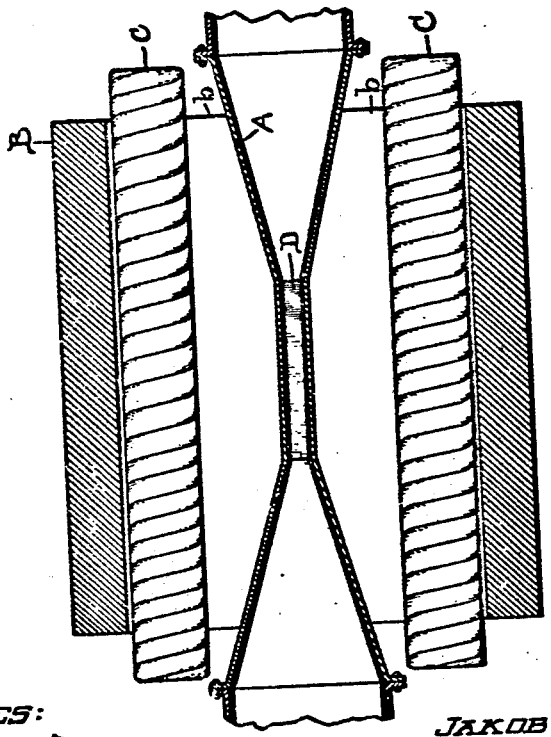
WITNESSES:
Lester H. Fulmer
J. Ellis Glenn
INVENTOR
JAKOB E. NOEGGERATH.
BY Albert G. Davis
ATT'Y.

UNITED STATES PATENT OFFICE.

JAKOB E. NOEGGERATH, OF SCHENECTADY, NEW YORK, ASSIGNOR TO GENERAL ELECTRIC COMPANY, A CORPORATION OF NEW YORK.

DYNAMO-ELECTRIC MACHINE.

957,242.  Specification of Letters Patent.  Patented May 10, 1910.

Application filed April 13, 1908. Serial No. 426,654.

*To all whom it may concern:*

Be it known that I, JAKOB E. NOEGGERATH, a citizen of the United States, residing at Schenectady, county of Schenectady, State of New York, have invented certain new and useful Improvements in Dynamo-Electric Machines, of which the following is a specification.

My invention relates to dynamo electric machines and its object is to provide a machine without moving parts which may be used as a generator to produce electric energy directly from the passage through it of a fluid, and which may be used as a motor for propelling ships by forcing a flow of water through it.

As a generator the machine may be used wherever there is a fall of water available, provided a small amount of salts are added to the water to make it sufficiently conductive. As a motor it is especially adapted for driving vessels on salt water, since the water of the ocean is sufficiently conductive for the proper operation of the machine.

It has been proposed heretofore to obtain electric energy directly from the flow of a fluid by subjecting the fluid to a magnetic field, leading off the current produced in the fluid through suitably arranged terminals. The structures that have been proposed for this purpose heretofore, however, have been practically inoperative, since the fluid which has just passed out from the influence of the field, and also the fluid which is just about to enter the field, has induced in it no electric force and therefore acts as a short circuit for the fluid that is within the influence of the field.

My invention consists in so arranging the machine that a comparatively high electromotive force is induced at one place in the machine while on each side of this place the electromotive force diminishes gradually. With such construction the distance between the point of maximum induced electromotive force and the nearest point of zero electromotive force may be made so great that because of the comparatively high resistance of the fluid between these points the short circuiting effect of the fluid outside of the field is nearly negligible.

The gradual reduction of the electromotive force may be obtained in either of two ways, or by both in combination. The amount of the induced electromotive force is proportional to the rate of flow of the fluid and to the strength of the field; therefore, by diminishing gradually either or both of these factors the induced electromotive force may be gradually diminished. The rate of flow of course depends upon the cross section of pipe, so that by forming the pipe with a comparatively small cross section near the center and allowing it to flare on each side of the center, a gradual reduction of the rate of flow is obtained. The field strength may be gradually reduced by gradually increasing the air gap. Either of the factors determining the electromotive force at any point may be made constant if desired, but I prefer to vary both in combination.

My invention will best be understood by reference to the accompanying drawings, in which—

Figure 1 shows a side elevation in cross section of the machine arranged in accordance with my invention, the cross section being taken on the dotted line 1—1 of Fig. 2, while Fig. 2 shows an end elevation in partial cross section, of the machine.

In the drawing "A" represents an insulated pipe section or fluid conduit. The pipe itself may be formed of insulated material, or preferably is merely lined therewith as indicated in the drawing.

"B" is a field magnet having poles $b$ $b$ on opposite sides of the pipe so as to produce a flux passing transversely through the pipe.

C, C represent the field coils of the machine which may be connected in any suitable manner. The pipe section A, has a comparatively small cross section near its center and flares toward each end. The faces of the poles $b$, follow the shape of the pipe so that the air gap in the magnetic circuit is smallest at the central portion of the pipe and increases toward the ends, and therefore the field strength is greatest at the central portion. Because of the variation in the cross section of the pipe and also in the field strength, a comparatively high electromotive force is induced in the fluid at the central portion of the pipe section, while gradually decreasing electromotive forces are induced toward the ends of the pipe section. The distance from the point of maximum induced electromotive force to the point of zero electromotive force is so great that the short circuiting effect of the fluid outside of the field is practically negligible. Conducting plates D are placed at the center of the pipe section to serve as terminals for the machine, from which current may be led, or to which current may be supplied when the machine is acting as a generator or motor.

In order to afford a magnetic circuit of fairly high efficiency, the dimension of the central cross section of the pipe in the direction of the flux is made much smaller than the dimension at right angles thereto, as is best shown in Fig. 2.

I do not desire to limit myself to the particular construction and arrangement of parts here shown, but aim in the appended claims to cover all modifications which are within the scope of my invention.

What I claim as new, and desire to secure by Letters Patent of the United States, is,—

1. A dynamo-electric machine comprising an insulated pipe, a field magnet having poles extending on opposite sides of said pipe so as to produce a flux passing transversely through said pipe, the central portions of the opposite pole faces being substantially parallel with each other and the ends of the poles being beveled so that the pole faces make an acute angle with each other and consequently gradually recede from each other, and current terminals within the pipe where the pole faces are parallel.

2. A dynamo electric machine comprising an insulated pipe of comparatively small cross section near its center and flaring at the ends, a field magnet and winding adapted to produce a flux passing transversely through said pipe, and current terminals within the central portion of said pipe on opposite sides of the path of said flux.

3. A dynamo electric machine comprising an insulated pipe of comparatively small cross section near its center and flaring at its ends, a field magnet and winding adapted to produce transversely through said pipe a flux comparatively strong at the central portion of the pipe, and gradually diminishing in strength toward its ends, and current terminals within the central portion of said pipe on opposite sides of the path of said flux.

4. A dynamo electric machine, comprising an insulated pipe of comparatively small cross section near its center and flaring at the ends, a field magnet and winding adapted to produce a flux passing transversely through said pipe, and current terminals within the central portion of said pipe on opposite sides of the path of said flux, the dimension of the central cross section of the pipe in the direction of the flux being much smaller than the dimension at right angles thereto.

5. A dynamo-electric machine comprising an insulated pipe, a field magnet having an insulated pipe, a field magnet having poles extending on opposite sides of said pipe so as to produce a flux passing transversely through said pipe, the central portions of the opposite pole faces being substantially parallel to each other and the ends of the pole being beveled so that the pole faces make an acute angle with each other and consequently gradually recede from each other, the portion of the pipe lying between the substantially parallel portions of the pole faces being of uniform cross section with the dimension in the direction of the flux much smaller than the dimension at right angles hereto, and current terminals within the central portion of said pipe on opposite sides of the path of said flux.

In witness whereof I have hereunto set my hand this 10th day of April 1908.

JAKOB E. NOEGGERATH.

Witnesses:
Benjamin B. Hull,
Helen Orford.